(12) United States Patent
Rosenkrantz

(10) Patent No.: US 8,727,161 B2
(45) Date of Patent: May 20, 2014

(54) RIM SPACE SEAL SYSTEM FOR USE WITH INTERNAL FLOATING ROOF

(76) Inventor: David Jon Rosenkrantz, Emmaus, PA (US)

(*) Notice: Subject to any disclaimer, the term of this patent is extended or adjusted under 35 U.S.C. 154(b) by 0 days.

(21) Appl. No.: 13/490,357

(22) Filed: Jun. 6, 2012

(65) Prior Publication Data

US 2014/0091091 A1 Apr. 3, 2014

(51) Int. Cl.
 *B65D 88/46* (2006.01)
 *F16J 15/34* (2006.01)
(52) U.S. Cl.
 CPC ............ *B65D 88/46* (2013.01); *F16J 15/3436* (2013.01)
 USPC ............ 220/224; 220/222; 277/353; 277/351
(58) Field of Classification Search
 CPC ........ B65D 88/46; B65D 88/42; B65D 88/34; F16J 15/3256; F16J 15/3436
 USPC .......... 220/224, 222, 221, 216, 226; 277/353, 277/351, 350, 347, 346
 IPC ............ B65D 88/46, 88/42, 88/34; F16J 15/34, F16J 15/00
 See application file for complete search history.

(56) References Cited

U.S. PATENT DOCUMENTS

| | | | | | |
|---|---|---|---|---|---|
| 1,426,998 | A | * | 8/1922 | Leland et al. | 220/224 |
| 1,514,116 | A | * | 11/1924 | Wiggins | 220/220 |
| 1,662,225 | A | * | 3/1928 | Wiggins | 220/224 |
| 1,673,984 | A | * | 6/1928 | Kuhl | 220/224 |
| 1,777,560 | A | * | 10/1930 | Griffin | 220/218 |
| 1,825,639 | A | * | 9/1931 | Shanor | 220/224 |
| 1,930,953 | A | * | 10/1933 | Hampton | 220/224 |
| 2,981,438 | A | * | 4/1961 | Heisterberg | 220/219 |
| 4,524,878 | A | * | 6/1985 | Imhof | 220/224 |
| 5,372,270 | A | | 12/1994 | Rosenkrantz | |
| 5,667,091 | A | * | 9/1997 | Slaber et al. | 220/224 |
| 6,164,479 | A | | 12/2000 | Kern | |

* cited by examiner

*Primary Examiner* — Robert J Hicks
(74) *Attorney, Agent, or Firm* — Sanford J. Piltch

(57) ABSTRACT

A rim seal system between the outer periphery of an internal floating roof and the bulk liquid tank wall including a laterally deployed first resilient or flexible seal member and a second laterally deployed rigid seal member interposed between the distal end of the first seal member and the tank wall where the rigid seal member provides protection from abrasion of the resilient or flexible seal member by frictional contact with the tank wall. An outwardly expanding hanger assembly mounted above the seal system maintains the rigid seal member in contact with the tank wall.

4 Claims, 3 Drawing Sheets

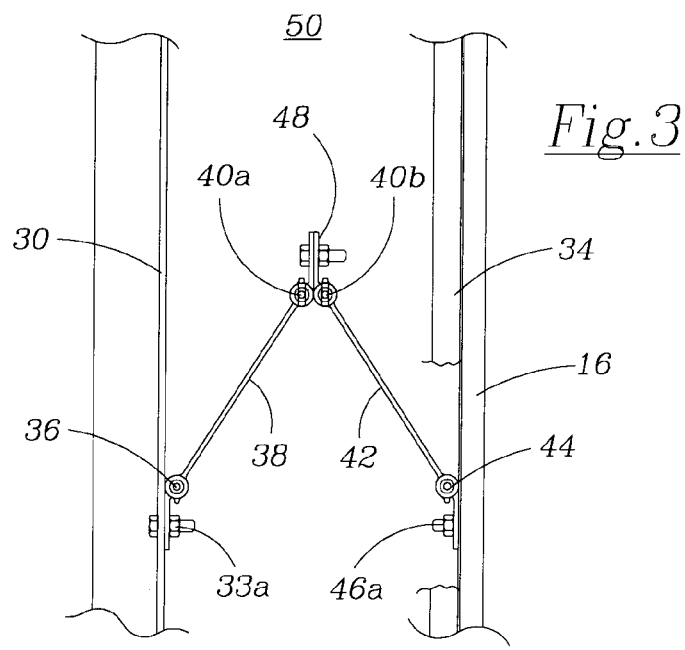
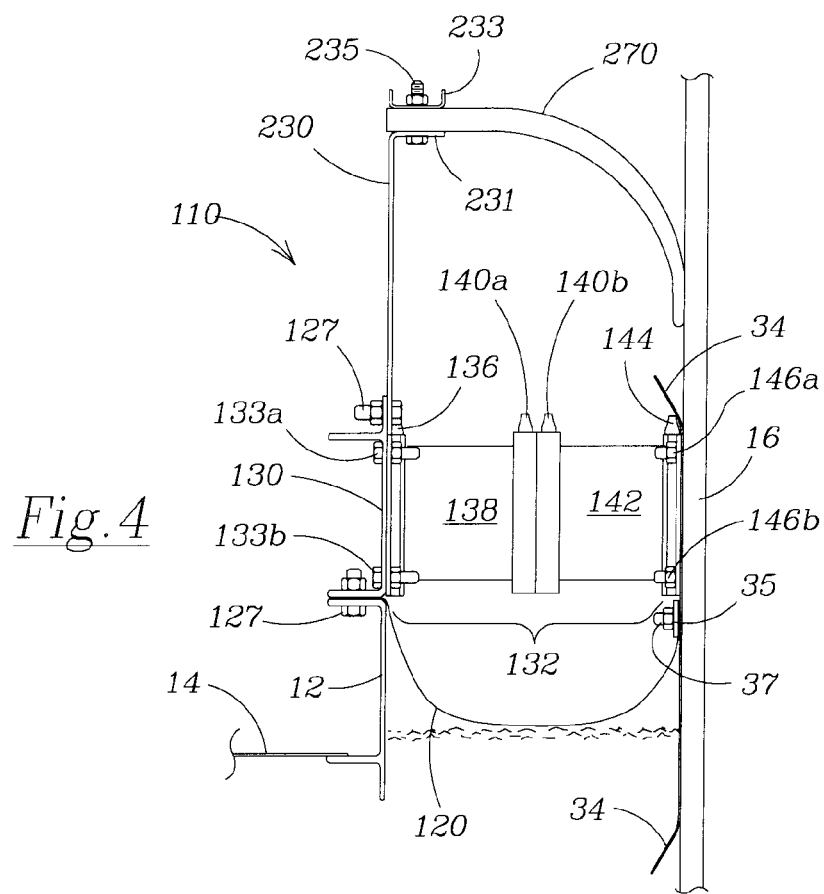

RIM SPACE SEAL SYSTEM FOR USE WITH INTERNAL FLOATING ROOF

BACKGROUND OF THE INVENTION

The present invention relates to sealing the space between the internal floating roof and the inner tank wall of a storage tank for volatile or hazardous liquids. The present invention provides a means for protecting the various seal mechanisms utilized with internal floating roofs and extending the life span for those sealing mechanisms.

Bulk fluids, such as petroleum, other fuel products and by-products, and chemicals are often stored in large cylindrical tanks. These tanks are commonly designed with internal floating roofs or bulk fluid covers to minimize product losses to the atmosphere. A critical part of the internal floating roof is the annular or rim space between the perimeter of the internal floating roof and the inner wall of the storage tank. For an average floating roof, approximately one-third of the evaporation loss of the bulk fluid can be attributed to those vapors that escape past the rim seal.

Three types of rim seals are known in the industry. These types of seals have been tested for their efficiency in reducing evaporative losses from the rim space. The seal types are: liquid-mounted resilient-filled seal; mechanical shoe seal; and vapor-mounted resilient-filled seal. These seals have been used for decades and their relative length of service is known. Testing has revealed that the most efficient seal is a liquid-mounted seal, followed by a mechanical shoe seal and finally a vapor-mounted seal. Seal efficiency has been shown to increase when a secondary seal is placed above the first seal. The Environmental Protection Agency and most state environmental regulations require either a single liquid-mounted seal or a double seal where a secondary seal is placed above a mechanical shoe or vapor-mounted seal.

Experience has shown; over the years that the various seal types have different life spans. The best seal type, the liquid-mounted seal, has the shortest life span, usually less than one year. The mechanical shoe seal has the longest life span, often more than twenty years. The vapor-mounted seal has a life span lasting five years on average. The life span is directly related to the frictional effect of the inner tank wall on the outer seal material as it continually comes into contact with the metal wall.

An early description of the use of a mechanical shoe type seal coupled with a vapor barrier may be found in U.S. Pat. No. 5,372,270. This patent also describes the use of a secondary seal in the form of a wiper blade mounted above the primary vapor-mounted seal. Protecting the lower vapor-mounted seal is its mounting to a mechanical shoe at the tank wall. However, the wiper seal does not have any protection from the reversal of movement flexure or from the frictional contact with the metal tank wall.

Another description of the seal types used with internal floating roofs can be found in U.S. Pat. No. 6,164,479. This patent describes dual vapor-mounted barriers spanning the rim space between the outer wall of the floating roof and a mechanical shoe riding against the tank wall. While the invention described in the '479 patent is the horizontal mounting of the hanger-pushers, the use of the vapor-mounted seals in tandem is disclosed where the primary seal is mounted below the liquid level and the fabric is permitted to rise above the liquid level and the secondary seal is mounted entirely above the liquid level in the vapor space.

Both of these early sealing systems required dual or tandem seals to achieve the reduction in product evaporation to satisfy the industry and its regulators. It is an object of the present invention to provide a rim seal that combines the efficiency of a liquid-mounted seal with the longevity of a mechanical shoe seal, thus increasing the life span of the liquid-mounted seal far beyond its present annual replacement.

The problems with both sealing systems was that in order to inspect the primary seal one was required to remove the secondary seal exposing the vapor collection space to the atmosphere and potentially endangering the human inspector. It is, therefore, an object of the present invention to provide a seal that is quick and safe to inspect.

It is yet another object of the present invention to provide a rim seal that is simple to manufacture and readily simple to install onto floating roofs, including retrofitting existing steel or aluminum floating roofs to carry the rim seal of the present invention.

It is also an object of the present invention to provide a rim seal that is compatible for use with any type of product being stored. Other objects will appear hereinafter.

SUMMARY OF THE INVENTION

The present invention is a rim seal system extending between the outer periphery of an internal floating roof and the bulk liquid tank wall. The rim seal system includes a laterally deployed first resilient or flexible sealing member and a second laterally deployed rigid sealing member interposed between the distal end of the first sealing member and the tank wall where the rigid seal member provides protection from abrasion of the resilient or flexible seal member by frictional contact with the tank wall. The rigid sealing member is held in proximal contact with the storage tank wall by an outwardly expanding hanger assembly mounted above the rim seal system.

The rim seal system is intended for use with an internal floating roof for a bulk liquid storage tank to prevent unwanted leakage and evaporation of the stored liquid. The rim seal system includes a primary sealing member mounted to and deployed laterally outward from the perimeter wall of the internal floating roof. The primary sealing member has sufficient length to span the rim space distance between the perimeter wall of the internal floating roof and the storage tank wall. The primary sealing member also has the capacity to resiliently compress when the rim space contracts due to lateral movement of the internal floating roof.

The rim seal system also includes a secondary rigid sealing member mounted to and deployed laterally outward from the perimeter wall of the internal floating roof. The secondary sealing member is interposed between the primary sealing member and the storage tank wall and is maintained in proximal contact with the storage tank wall by an outwardly expanding hanger assembly. The hanger assembly includes a plurality of tension joints with interspersed extension plates for urging the hanger assembly to its maximum length, thus causing the attached secondary rigid sealing member to remain in contact with the storage tank wall at all times. The combination of the two sealing members provides the protection against leakage and evaporation of the stored liquid by operating together to fill the rim space distance between the perimeter wall of the floating roof and the storage tank wall. The secondary rigid sealing member by its interposition between the primary sealing member and the storage tank wall also provides abrasion protection for the primary sealing member as the internal floating roof changes vertical position due to volumetric changes in the stored liquid within the storage tank.

In order to maintain the integrity of the primary sealing member, it may be surrounded by a protective fabric to prevent abrasion or puncture. The second element of the rim seal system, the secondary rigid sealing member, is preferred to be a mechanical shoe sealing member.

The rim seal system of may further include a third sealing member positioned above the primary and secondary sealing members and deployed laterally outward from a vertical extension of the perimeter wall of the internal floating roof. The third sealing member has sufficient length to span the rim space distance between the perimeter wall of the internal floating roof and the storage tank wall. The third sealing member has the capacity to flex and follow the direction of vertical movement of the internal floating roof while remaining in constant contact with the storage tank wall.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 3 is a top view of the hanger assembly for the protective metal shoe of the rim seal system extending between the internal floating roof and the protective metal shoe.

FIG. 4 is a side elevational view of a second embodiment of the rim seal system of the present invention showing a vapor-mounted seal and protective metal shoe mounted to the perimeter of an internal floating roof with a wiper type secondary seal mounted above.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
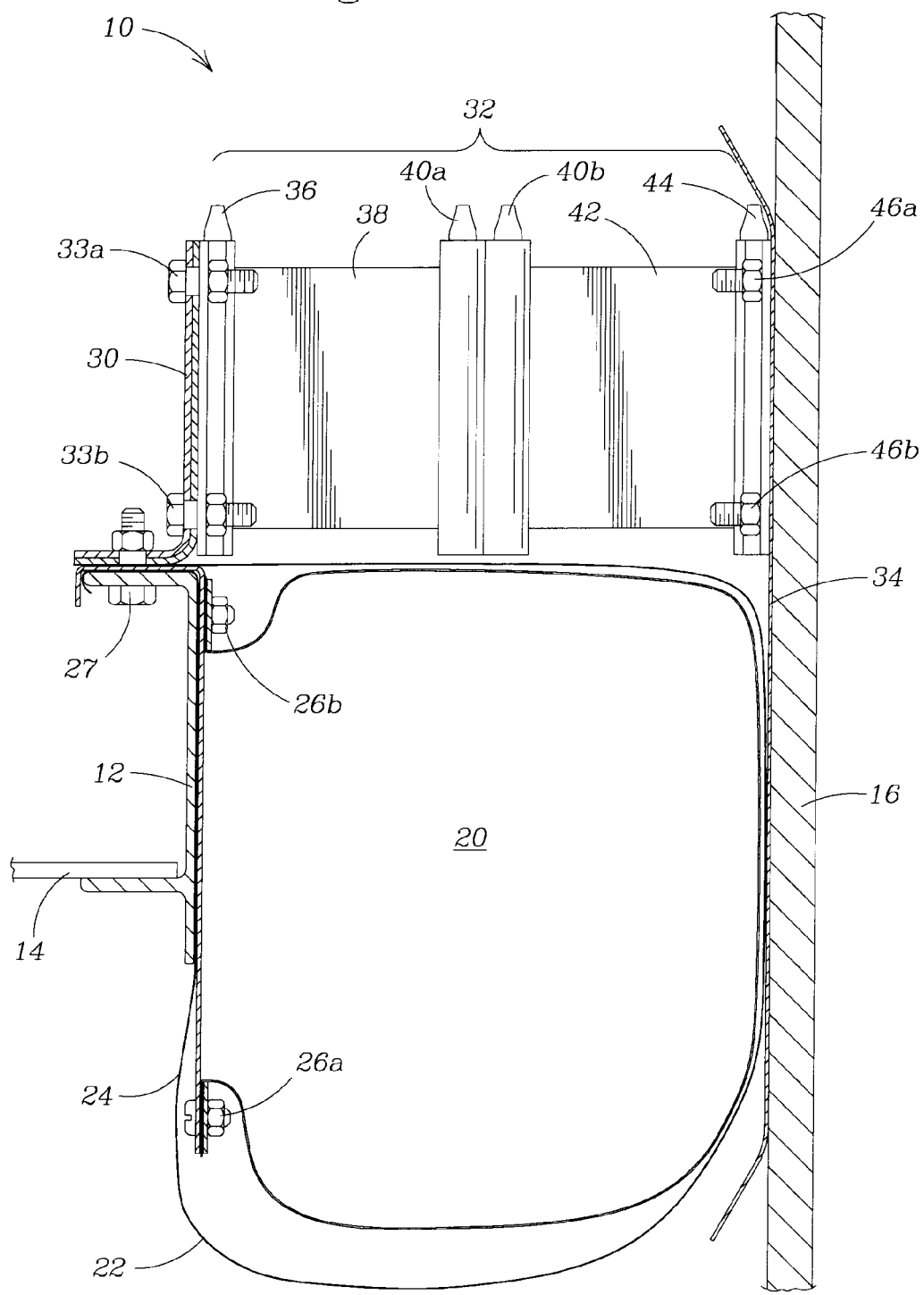
FIG. 1 is a side elevational view of a first embodiment of the rim seal system of the present invention showing a liquid-mounted seal and protective metal shoe mounted to the perimeter wall of an internal floating roof.

Referring now to the drawings in detail, where like numerals refer to like parts or elements, there is shown in FIG. 1 a first embodiment of a peripherally mounted floating roof seal 10 of the present invention. The seal is mounted to the outer perimeter structure of an internal floating roof within a storage tank. The perimeter structure of the floating roof shown in FIG. 1 includes an outer sidewall 12 of an open top panel system having a bottom plate 14 extending inward into the space defined by the other sidewalls of the panel system. The floating roof structure is set off from the inner tank wall 16 creating an annular or rim space in which the floating roof can move in the horizontal plane as its floats on the surface of the stored liquid. In the annular or rim space a seal is deployed to reduce as much as possible the evaporation of the stored liquid into the internal tank atmosphere. In this embodiment the seal is depicted as a liquid-mounted seal 20 with a solid foam core disposed within a fabric membrane or cover 22 that is mounted onto a mounting plate 24 by fastening means 26a, 26b. The fabric membrane 22 surrounding the liquid-mounted seal 20 is provided to protect the compressible solid foam core 20 from damage. The lower end of the outer protective fabric cover 22 is sandwiched between the mounting plate 24 and the outer sidewall 12 of the floating roof as the mounting plate 24 is attached to the floating roof using fastener 27. The upper end of the outer protective fabric cover 22 is also sandwiched between the upper flange of the outer sidewall 12 of the floating roof and the bottom foot of an extension plate 30 extending upward from the top of the outer sidewall 12. The extension plate 30 is a reinforced plate shown as being doubled in thickness in FIG. 1. The extension plate 30 is used to mount the hanger assembly 32 that supports the protective shoe 34 that rides against the inner tank wall 16. The protective shoe 34 extends from the height of the hanger assembly 32 downward between the liquid-mounted seal 20 and the inner tank wall 16 to a point below possible contact by the liquid-mounted seal 20 and the inner tank wall 16. In this way the protective shoe 34 prevents either the protective fabric 22 surrounding the solid foam core of the liquid-mounted seal 20, or the foam core of the liquid mounted seal 20, from being abraded as the floating roof traverses upward and downward inside the tank as the liquid surface changes heights due to volume increases or decreases. The protective shoe 34 serves a second purpose as being the point of mechanical contact of the rim seal system 10 with the inner wall 16 of the tank for the rim seal system 10 of the present invention.

A hanger assembly 32 spans the distance between the outer perimeter of the floating roof and the inner tank wall 16. On the floating roof side the hanger assembly 32 is securely fastened to the extension plate 30 by two fastening means 33a, 33b. Extending outward from the extension plate 30 is proximal tension joint 36 to which is attached a first extension plate 38. At the distal end of extension plate 38 are a pair of cooperating intermediate tension joints 40a, 40b. First extension plate 38 is attached to tension joint 40a that is, in turn attached to tension joint 40b. Second extension plate 42 is attached between tension joint 40b and distal tension joint 44. The protective shoe 34 is attached to distal tension joint 44 by fasteners 46a, 46b.

The hanger assembly 32 has two functions. The first is to maintain the protective shoe 34 at the required lateral position relative to the floating roof to protect the seal 20 and its protective fabric 22 from unwanted abrasion. The second function of the hanger assembly is to extend the protective shoe 34 outward to remain in constant contact with the inner tank wall 16 providing the seal for the rim seal system 10 against the tank wall 16. To accomplish this second task, the hanger assembly 32 includes the tension joints 36, 40a, 40b and 44 that exert a spring force against the extension plates 38, 42 forcing the extension plates 38, 42 to extend to the greatest allowable angular relationship at any given time. In this way the protective shoe 34 is maintained at the proper lateral position to the floating roof and in constant contact with the inner tank wall 16.

The solid foam core of the liquid-mounted seal 20, which is mounted below the hanger assembly 32, is resiliently flexible to accommodate lesser or greater distances between the outer sidewall 12 of the floating roof and the protective shoe 34 to its maximum horizontal dimension, which dimension is greater than the annular distance of the rim space with the floating roof centered within the tank. In this way the liquid-mounted seal 20 is able to serve one of its dual purposes of allowing the floating roof to change its vertical position as the volume of the fluid in the tank increases or decreases without binding against the inner tank wall 16. The other purpose is to prevent the escape of harmful vapors or to allow evaporation of the liquid beyond the floating roof into the atmosphere within the tank. With the liquid-mounted seal 20 extending without gaps from the outer perimeter sidewall 12 of the floating roof to the proximal side of the protective shoe 34 and the protective shoe 34 maintained in contact against the tank wall 16, the seal is maintained as the floating roof changes its vertical position as necessitated by the volume of fluid within the tank.

Figure 2:
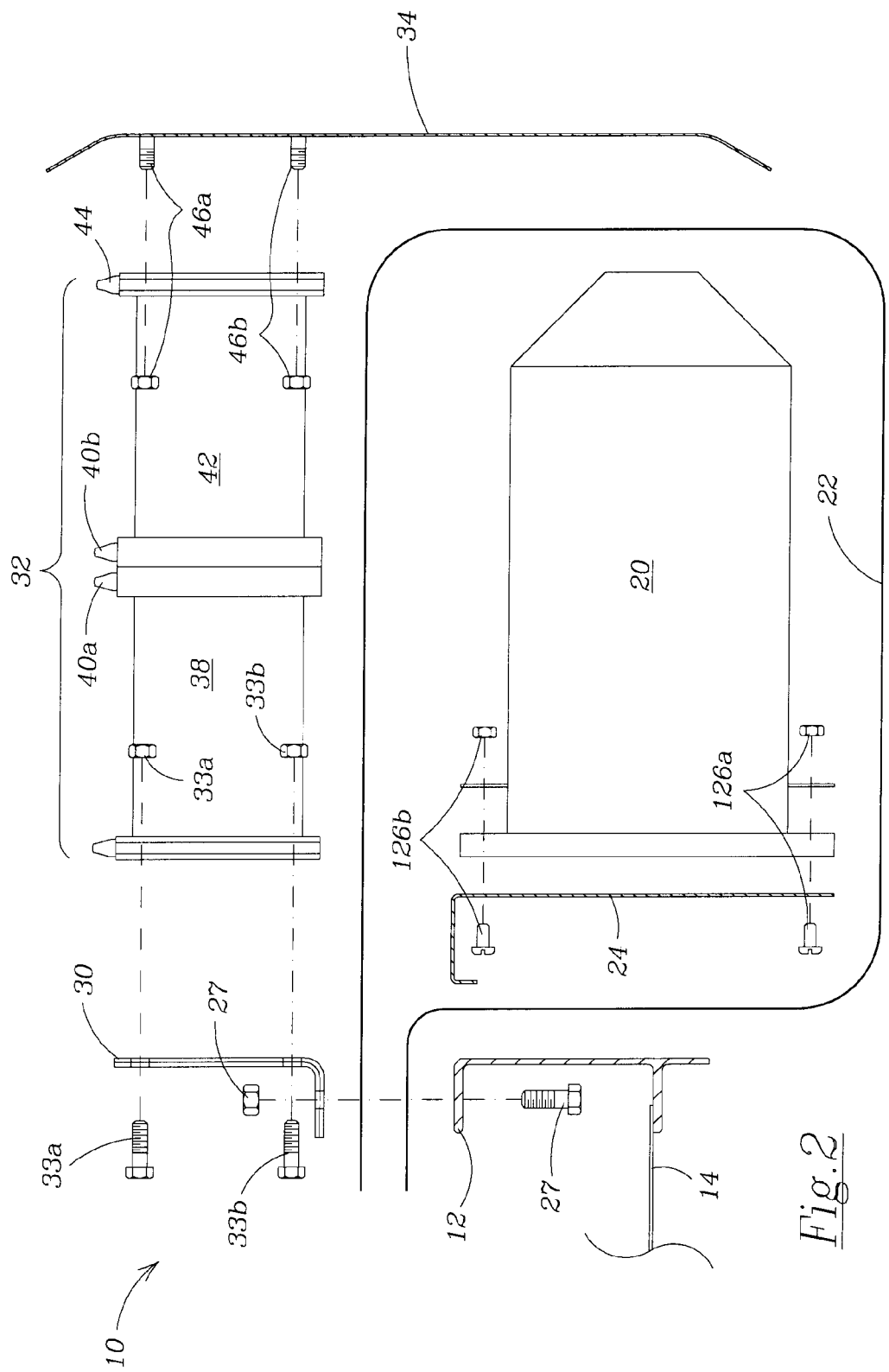
FIG. 2 is an exploded side view of the first embodiment of the rim seal system of the present invention showing the elements for mounting the liquid mounted seal and protective metal shoe to the perimeter wall of an internal floating roof.

Referring now to FIG. 2, an exploded view of the rim seal system 10 of the present invention is shown for greater clarity. The liquid mounted seal 20 is comprised of a solid core seal member mounted to the mounting plate 24 by fasteners 26a, 26b. Surrounding the seal core member of the liquid mounted seal 20 is a protective fabric 22 that encircles the seal core member and is attached by sandwiching the lower end of the protective fabric 22 between the mounting plate 24 and the outer perimeter sidewall 12 of the floating roof. A partial perimeter section of the floating roof is depicted as the outer perimeter sidewall 12 and bottom plate 14 creating one of a plurality of open top panel systems comprising the floating roof. The upper end of the protective fabric 22 is sandwiched between the upper flange of the outer sidewall 12 and the extension plate 30. The lower end of the outer protective fabric 22 is sandwiched between the mounting plate 24 and the outer sidewall 12 of the floating roof as the mounting plate 24 is attached to the floating roof using fastener 27. The upper end of the outer fabric protector 22 is also sandwiched between the upper flange of the outer sidewall 12 of the floating roof and the bottom foot of an extension plate 30 extending upward from the top of the outer sidewall 12. The extension plate 30 is a reinforced plate having a doubled thickness. The extension plate 30 is used to mount the hanger assembly 32 that supports the protective shoe 34 that rides against the inner tank wall 16. The protective shoe 34 extends from the height of the hanger assembly 32 downward between the liquid mounted seal 20 with its protective cover 22 and the inner tank wall 16 to a point below possible contact by the liquid mounted seal 20 with the inner tank wall 16. In this way the protective shoe 34 prevents the liquid mounted seal 20 and its protective fabric 22 surrounding the solid core seal member from being abraded as the floating roof traverses upward and downward inside the tank as the liquid surface changes heights due to volume increases or decreases.

The hanger assembly 32 spans the distance between the outer perimeter of the floating roof and the inner tank wall 16. On the floating roof side the hanger assembly 32 is securely fastened to the extension plate 30 by two fastening means 33a, 33b. Extending outward from the extension plate 30 is proximal tension joint 36 to which is attached a first extension plate 38. At the distal end of extension plate 38 are a pair of cooperating intermediate tension joints 40a, 40b. First extension plate 38 is attached to tension joint 40a that is, in turn, attached to tension joint 40b. Second extension plate 42 is attached between tension joint 40b and distal tension joint 44. The protective shoe 34 is attached to distal tension joint 44 by fasteners 46a, 46b. This structure maintains the protective shoe 34 at the required lateral position relative to the floating roof to protect the liquid mounted seal 20 and its protective fabric 22 from unwanted abrasion. The hanger assembly structure also provides an outward force extending against the protective shoe 34 to retain the shoe 34 in constant contact with the inner tank wall 16. To accomplish this second task, the hanger assembly 32 includes the tension joints 36, 40a, 40b and 44 that exert a spring force against the extension plates 38, 42 forcing the extension plates 38, 42 to extend to the greatest allowable angular relationship at any given time. In this way the protective shoe 34 is maintained at the proper lateral position to the floating roof and in constant contact with the inner tank wall 16.

Shown in FIG. 3 is a top down view of the hanger assembly spanning the rim space between the internal floating roof and the inner wall of the tank. We will utilize the element numbers from the first embodiment of FIG. 1 in describing the structural relationship, but it is to be understood that the element numbers for the second embodiment shown in FIG. 4 having similar numbers are intended to be included in this description. The hanger assembly 32 extends across the rim space 50 between the extension plate 30 and the protective shoe 34 riding against the inner wall 16 of the storage tank. As the rim space 50 changes due to the internal floating roof shifting its intended central position closer or away from any given point on the inner wall 16 of the tank, the hanger assembly 32 expands or contracts to accommodate the changing distance and to maintain the protective shoe 34 in contact against the inner wall 16.

Looking down from the top, the hanger assembly 32, at its central point where the intermediate tension joints 40a, 40b are arranged, the intermediate tension joints 40a, 40b are coupled together by fasteners 48 located at the top and bottom of the tension joints 40a, 40b such that the spring tension creates an outward force expanding the hanger assembly 32 unless compressed by the internal floating roof shifting too close to an opposing segment of the inner wall 16. In this way the internal floating roof maintains a substantially uniform distance (rim space) from the inner wall 16 of the tank such that the seals of the different embodiments can remain effective in closing off the rim space 50 and reducing the evaporative effect of the stored liquid. In describing only a single unit of the entire rim seal system it is to be understood that a plurality of these units are arrayed without lateral gaps about the entire periphery of the internal floating roof extending into the rim space to provide the barrier across the rim space to prevent leakage and evaporation of the stored liquid.

In FIG. 4 a second embodiment of the rim seal system 110 of the present invention is depicted with a flexible membrane type seal as the primary seal and a wiper type seal positioned above as the secondary seal. In this embodiment, the rim seal system 110 is comprised of a flexible membrane seal 120 mounted between the outer sidewall 12 of the floating roof and the protective shoe 34. A partial perimeter section of the floating roof is depicted as the outer perimeter sidewall 12 and bottom plate 14 creating one of a plurality of open top panel systems comprising the floating roof. The flexible membrane seal 120 is sandwiched between the upper flange of the outer sidewall 12 and the bottom foot of the extension plate 130 using fastener 127. At its other end, the flexible membrane seal 120 is attached along the mid-portion of the protective shoe 34 by mounting plate 35 and fasteners 37. The extension plate 130 is a reinforced plate extending upward from the top of the outer sidewall 12 and is used to mount the hanger assembly 132 that supports the protective shoe 34 that rides against the inner tank wall 16. The protective shoe 34 extends from the height of the hanger assembly 132 downward between the flexible membrane seal 120 and the inner tank wall 16 to a point below possible contact by the flexible membrane seal 120 and the inner tank wall 16. In this way the protective shoe 34 prevents the flexible membrane seal 120 from being abraded as the floating roof traverses upward and downward inside the tank as the liquid surface changes heights due to volume increases or decreases.

The hanger assembly 132 spans the distance between the outer perimeter of the floating roof and the inner tank wall 16.

On the floating roof side the hanger assembly 132 is securely fastened to the extension plate 130 by two fastening means 133a, 133b. Extending outward from the extension plate 130 is proximal tension joint 136 to which is attached a first extension plate 138. At the distal end of extension plate 138 are a pair of cooperating intermediate tension joints 140a, 140b. First extension plate 138 is attached to tension joint 140a that is, in turn, attached to tension joint 140b. Second extension plate 142 is attached between tension joint 140b and distal tension joint 144. The protective shoe 34 is attached to distal tension joint 144 by fasteners 146a, 146b. As before, the hanger assembly has two functions. The first is to maintain the protective shoe 34 at the required lateral position relative to the floating roof to protect the seal 120 from unwanted abrasion. The second function of the hanger assembly is to extend the protective shoe 34 outward to remain in constant contact with the inner tank wall 16. To accomplish this second task, the hanger assembly 132 includes the tension joints 136, 140a, 140b and 144 that exert a spring force against the extension plates 138, 142 forcing the extension plates 138, 142 to extend to the greatest allowable angular relationship at any given time. In this way the protective shoe 34 is maintained at the proper lateral position to the floating roof and in constant contact with the inner tank wall 16.

The flexible membrane seal 120, which is mounted below the hanger assembly 132, is flexible and of sufficient length to accommodate lesser or greater distances between the outer sidewall 12 of the floating roof and the protective shoe 34 to its maximum horizontal dimension, which dimension is less than the annular distance of the rim space with the floating roof centered within the tank. In this way the flexible membrane seal 120 is able to serve one of its dual purposes of allowing the floating roof to change its vertical position as the volume of the fluid in the tank increases or decreases without binding against the inner tank wall 16. The other purpose is to prevent the escape of harmful vapors or to allow evaporation of the liquid beyond the floating roof into the atmosphere within the tank. With the flexible membrane seal 120 extending without gaps from the outer perimeter sidewall 12 of the floating roof to the proximal side of the protective shoe 34, the seal is maintained as the floating roof changes its vertical position as necessitated by the volume of fluid within the tank. A second purpose of the protective shoe 34 is to also prevent the escape of harmful vapors or to allow evaporation of the liquid beyond the floating roof into the atmosphere within the tank. Located at the distal end of and in contact with the flexible membrane seal 120, the protective shoe 34 is maintained in contact against the tank wall 16 so that the rim seal system 110 is maintained as the floating roof changes its vertical position as necessitated by the volume of fluid within the tank Positioned above the flexible membrane seal 120 is a secondary wiper type seal 220. The wiper type seal 220 is attached to an elongated upper extension plate 230 that is fastened to the lower extension plate 130 by fasteners 133a, 133b and by additional fastener 227. The elongated upper extension plate 230 permits the wiper type blade seal free motion above the hanger assembly 132. The wiper type seal 220 is sandwiched between the top flange 231 of the upper extension plate 230 and a clamping plate 233 and is attached to the upper extension plate 230 by the clamping plate 233 and fasteners 235. In this way the wiper type seal 220 acts as a secondary seal between the internal floating roof and the extended outer wall formed by the extension plate 130 and the upper extension plate 230 that is coterminous with the outer wall 12 of the floating roof creating the inner wall for containing any vapors or gases that penetrate through the primary seal, the flexible membrane seal 120. The wiper type seal 220 remains in direct and constant contact with the inner wall 16 of the tank and is of sufficient length to maintain that contact even as the rim space tends to increase or decrease as the floating roof may move off center so that the rim space is not exactly the same at all points between the floating roof and the tank wall.

It is to be understood from the description presented of each of the three embodiments of the rim seal system 10 and 110 for a floating roof in a bulk liquid storage tank that the extension plates provide an extension of the outer wall of the floating roof in an upward direction that creates a vertically extended rim space within which space the rim seal systems 10 and 110 function to prevent leakage or evaporation of the stored liquid. It is also to be understood the wiper type seal 220 can be utilized with the other rim seal system 10 by the addition of the upper extension plate 230 and wiper type seal 220 to the described system without any change to the structure or function of the rim seal system 10.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A rim seal system for use with an internal floating roof for a bulk liquid storage tank to prevent unwanted leakage and evaporation of a stored liquid comprising:

a bulk liquid storage tank for containing the stored liquid, said storage tank having an outer containment wall with an inward facing surface;

an internal floating roof situated within the bulk liquid storage tank atop the stored liquid, said floating roof having an outward facing perimeter wall;

a primary sealing member mounted to and deployed laterally outward from and immediately adjacent to and extending below the perimeter wall of the internal floating roof, said primary sealing member comprising a liquid-mounted seal entirely surrounding the internal floating roof without gaps having a compressible core with a depth greater than the annular distance across the rim space between the perimeter wall of the internal floating roof and the inner surface of the storage tank wall and having the capacity to resiliently compress when the rim space contracts and to expand when the rim space increases due to lateral movement of the internal floating roof;

a secondary rigid sealing member mounted to and deployed laterally outward from the perimeter wall of the internal floating roof, said secondary sealing member being interposed between the primary sealing member and the inner surface of the storage tank wall and being maintained in proximal contact with said storage tank wall by an outwardly expanding hanger assembly and by the primary sealing member;

said secondary rigid sealing member providing abrasion protection for said primary sealing member as the internal floating roof changes vertical position due to volumetric changes in the stored liquid within the storage tank.

2. The rim seal system of claim 1, wherein said primary sealing member is surrounded by a protective fabric to prevent abrasion or puncture.

3. The rim seal system of claim 1, further comprising a third sealing member positioned above the primary and secondary sealing members and deployed laterally outward from an extension of the perimeter wall of the internal floating roof, said third sealing member having sufficient length to span the rim space distance between the perimeter wall of the internal floating roof and the storage tank wall and having the capacity to flex and follow the direction of vertical movement of the internal floating roof while remaining in constant contact with the storage tank wall.

4. The rim seal system of claim 1, wherein the hanger assembly includes a plurality of tension joints with interspersed extension plates for urging the hanger assembly to its maximum length, thus causing the attached secondary rigid sealing member to remain in contact with the storage tank wall at all times.

\* \* \* \* \*